(12) United States Patent
Davies

(10) Patent No.: US 6,474,623 B1
(45) Date of Patent: Nov. 5, 2002

(54) VALVE MECHANISM AND CONTROL

(76) Inventor: Theodore Evan Davies, 30 High St., Hudson, OH (US) 44236

( * ) Notice: Subject to any disclaimer, the term of this patent is extended or adjusted under 35 U.S.C. 154(b) by 0 days.

(21) Appl. No.: 09/919,631

(22) Filed: Jul. 31, 2001

(51) Int. Cl.[7] ............................................. F16K 31/126
(52) U.S. Cl. ........................ 251/298; 251/61; 251/61.2; 251/228
(58) Field of Search ........................ 251/61, 61.2, 298, 251/228, 301, 302; 137/527, 527.4

(56) References Cited

U.S. PATENT DOCUMENTS

| | | | | |
|---|---|---|---|---|
| 1,359,198 A | * | 11/1920 | Rayfield ........................ | 251/61 |
| 2,285,324 A | * | 6/1942 | Bennett ..................... | 251/61 X |
| 3,771,759 A | * | 11/1973 | Pauquette ..................... | 251/58 |
| 4,367,861 A | * | 1/1983 | Bray et al. ..................... | 251/61 |
| 5,236,007 A | * | 8/1993 | Scaramucci .......... | 137/527.4 X |

* cited by examiner

Primary Examiner—Kevin Lee

(57) ABSTRACT

A valve assembly has a valve body in which an inlet port is formed. A valve seat, penetrated by an elliptical opening, is secured in the valve body to provide an outlet port. The inlet port communicates with an inlet chamber, and the outlet port communicates with an outlet chamber. An untethered valve disc is pivotally movable with respect to the valve seat intermediate the inlet and the outlet chambers to control opening and closing of the elliptical opening through the valve seat. A motor and a control rod are utilized selectively to effect pivotal movement of the valve disc to open the valve for fluid flow and to permit closure of the valve when fluid flow is to be discontinued. The motor incorporates a diaphragm to move a piston that, in turn, axially translates the control rod in response to the pressure in a chamber bounded, at least in part, by the diaphragm. The control rod operatively engages the valve disc such that axial translation of the rod allows the valve disc to pivot in response to the pressure applied against the valve disc by the pressurized fluid in the inlet chamber.

17 Claims, 4 Drawing Sheets

VALVE MECHANISM AND CONTROL

TECHNICAL FIELD

The present invention relates to valve mechanisms, and more particularly to valve mechanisms for controlling liquid and/or gaseous flows as well as liquid and/or gaseous pressures with a motor controller including a diaphragm and a force transfer control rod to actuate the valve element.

BACKGROUND OF THE INVENTION

Prior art diaphragm valves typically possess seven desirable features. First, a powerful electrical, pneumatic or hydraulic valve actuator is not required. Flow rates may be controlled by one or two small, low torque, inexpensive pilot valves such as manual cocks, solenoid valves, float valves, bi-metal valves, metal expansion valves, vapor expansion valves and/or other similar arrangements.

Second, because travel of the valve element in a diaphragm valve is almost frictionless, hysteresis is negligible. Therefore, the flow rate through a diaphragm valve can be controlled with high precision without the need for an expensive valve positioner, as is required with butterfly valves, or eccentric disk valves.

Third, tight shut-off can be achieved more economically with a diaphragm valve than is possible with valves in which the moving valve element rotates, as in butterfly valves, ball valves and plug valves.

Fourth, the controlling pilot valve can be located remotely from the main diaphragm valve. This feature is particularly beneficial for very large, manually operated valves.

Fifth, closing and opening valve speeds can be adjusted independently.

Sixth, proportional control (which is accomplished by gradually decreasing the valve travel speed as the flow rate approaches the set-point) can be achieved by varying the on-time of pulsing solenoid pilot valves.

Seventh, valve packing is eliminated with diaphragm valves.

In contrast to the foregoing desirable features, prior art diaphragm valves exhibit three undesirable features.

First, prior art diaphragm valves produce a high pressure drop compared to ball valves, gate valves and butterfly valves.

Second, prior art diaphragm valves are suitable for controlling the flow of liquids. They cannot, however, be used to control gases.

Third, prior art diaphragm valves have flow curves which produce imprecise control at very low flows.

SUMMARY OF THE INVENTION

It is, therefore, one primary aspect of the present invention to provide a new and novel diaphragm valve.

It is another aspect of the present invention to provide a new and novel diaphragm valve assembly, as above, whereby the aforesaid undesirable features are eliminated.

It is a further aspect of the present invention to provide a new and novel diaphragm valve assembly, as above, whereby the aforesaid desirable features are retained.

These and other aspects of the invention, as well as the advantages thereof over existing and prior art forms, which will be apparent in view of the following detailed specification, are accomplished by means hereinafter described and claimed.

By way of a general introductory description, a valve assembly embodying the concepts of the present invention may utilize a valve housing having an inlet port. A valve seat is disposed in the valve housing to present an outlet port that is aligned substantially axially with the inlet port. As such, an axial flow path traverses the valve. An untethered valve element, or valve disc, is positioned for pivotal movement with respect to the valve seat and to be disposed within the axial flow path generally intermediate the inlet port and the outlet port to control fluid flow therebetween. A control mechanism for the improved diaphragm valve includes a motor to reciprocate a force transfer, or control, rod that is disposed angularly relative to the axial flow path. The control rod engages the valve disc to transfer forces from the motor to the valve disc in order to effect pivotal movement of the valve disc and thereby control the effective cross section of the axial flow path.

DESCRIPTION OF AN EXEMPLARY EMBODIMENT

Figure 1:
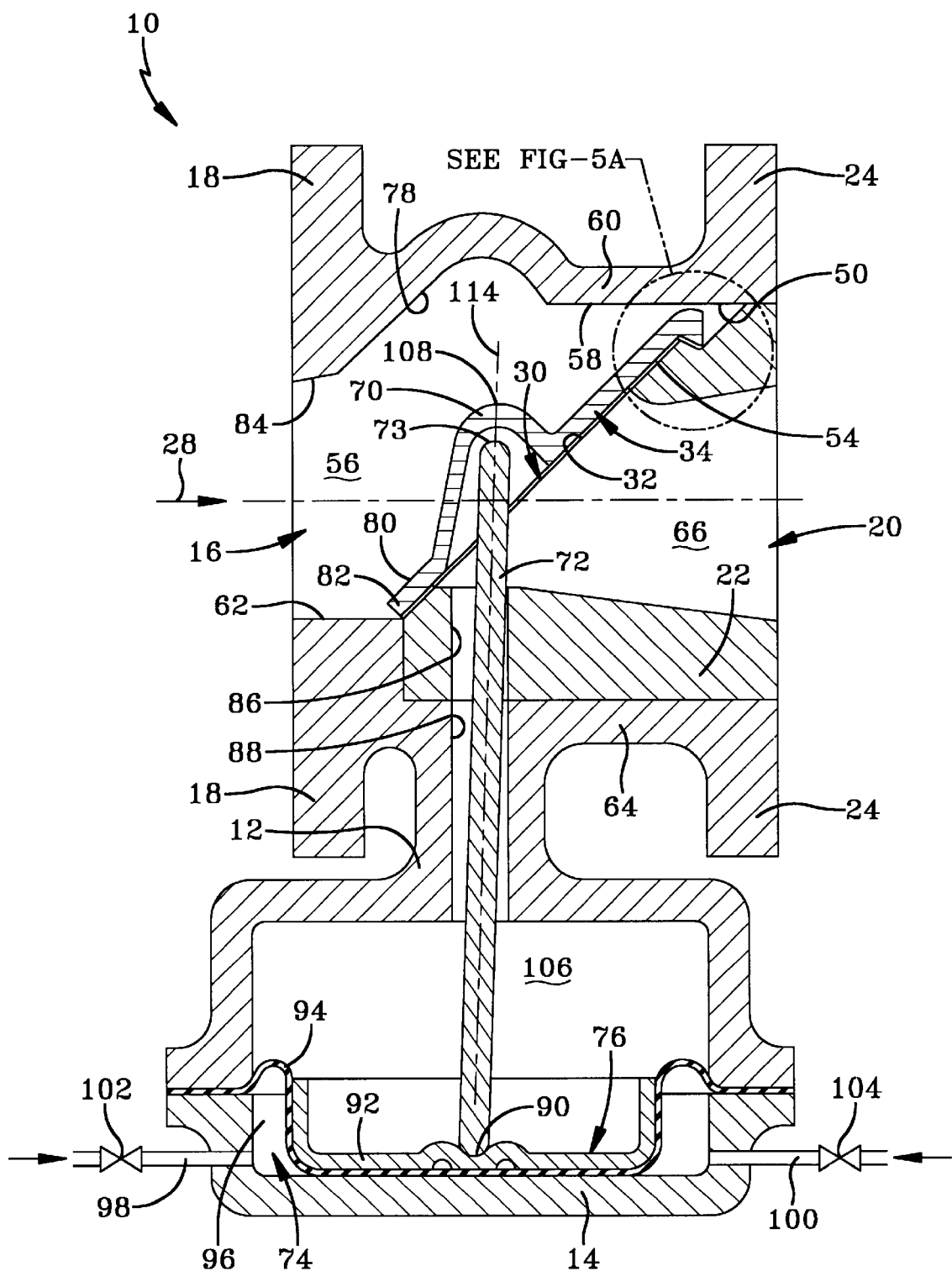
FIG. 1 is an elevational view in section of a valve assembly incorporating a representative embodiment of the present invention and depicting the valve in the closed position.

Referring to the drawings wherein like characters represent the same or corresponding parts, a valve assembly 10 embodying the concepts of the present invention is depicted in FIG. 1. The valve assembly 10 has a valve housing 12 and a motor cover 14. The motor cover 14 may be attached to the valve housing 12 by conventional fasteners not shown.

The valve housing 12 has an inlet, or input, port 16 with an annular flange 18 located peripherally of the inlet port 16. It must be understood, however, that the present invention is not to be limited to the means by which a connection may be effected to an inlet pipe. That is, one may employ flanged, screwed, slip fit, welded or any other type of pipe connection known to the art.

An outlet port 20 penetrates a valve seat 22 that may be secured within the valve housing 12, and an annular flange 24 is located peripherally of the outlet port 20.

Figure 2:
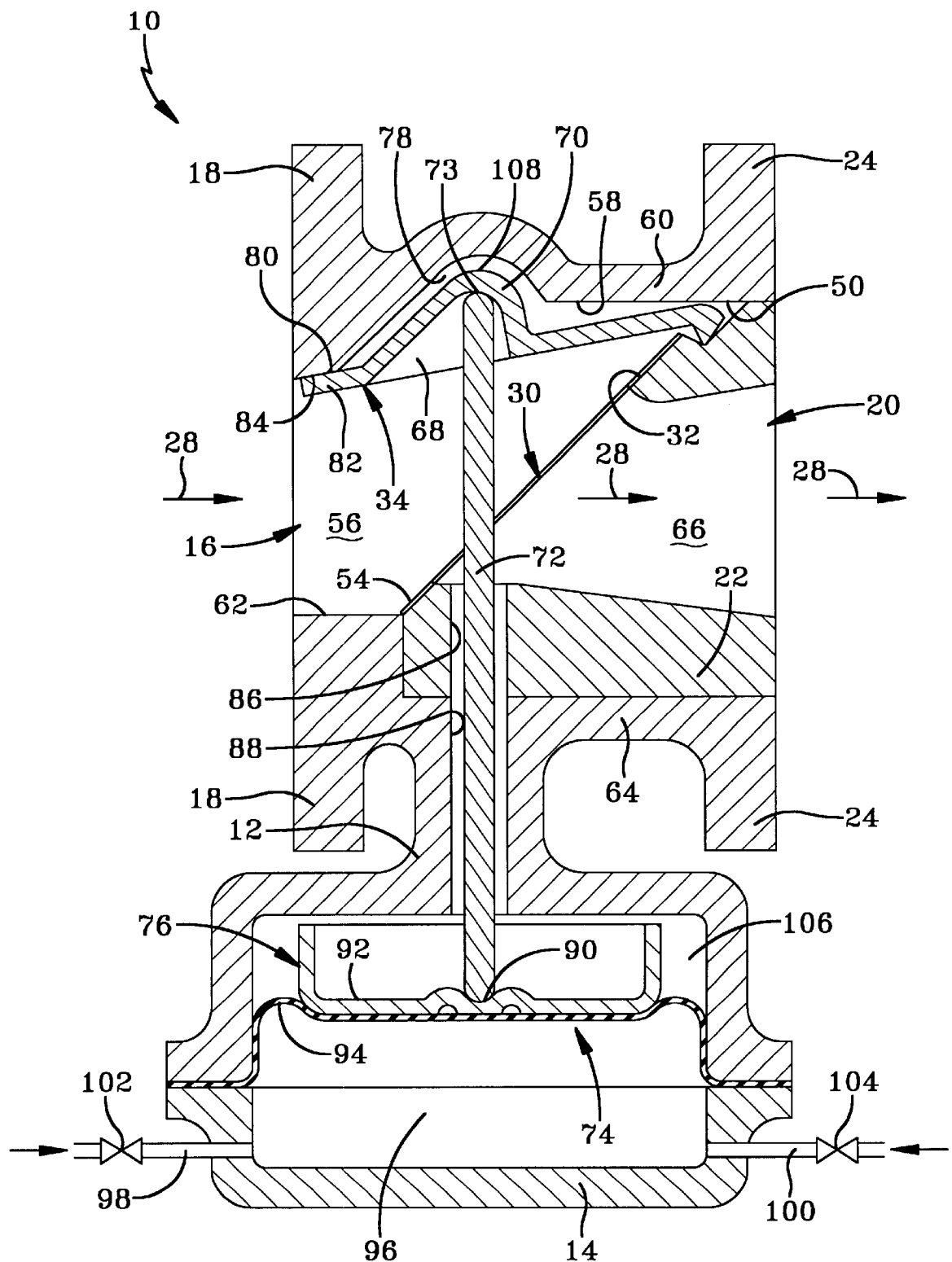
FIG. 2 is a view similar to FIG. 1 but depicting the valve in the open position.

Fluid flow through the valve assembly 10 is represented by the arrows 28 in FIGS. 1 and 2, and as such it can be seen that the flow is the desired axial in-line flow path between the inlet port 16 and the outlet port 20. That is, the inlet port 16 and the outlet port 20 are aligned axially. The valve seat 22 presents an elliptical opening 30 to the inlet port 16 through a valve surface 32 that is disposed at an angle relative to the openings that define the inlet port 16 and the outlet port 20, respectively.

Figure 5A:
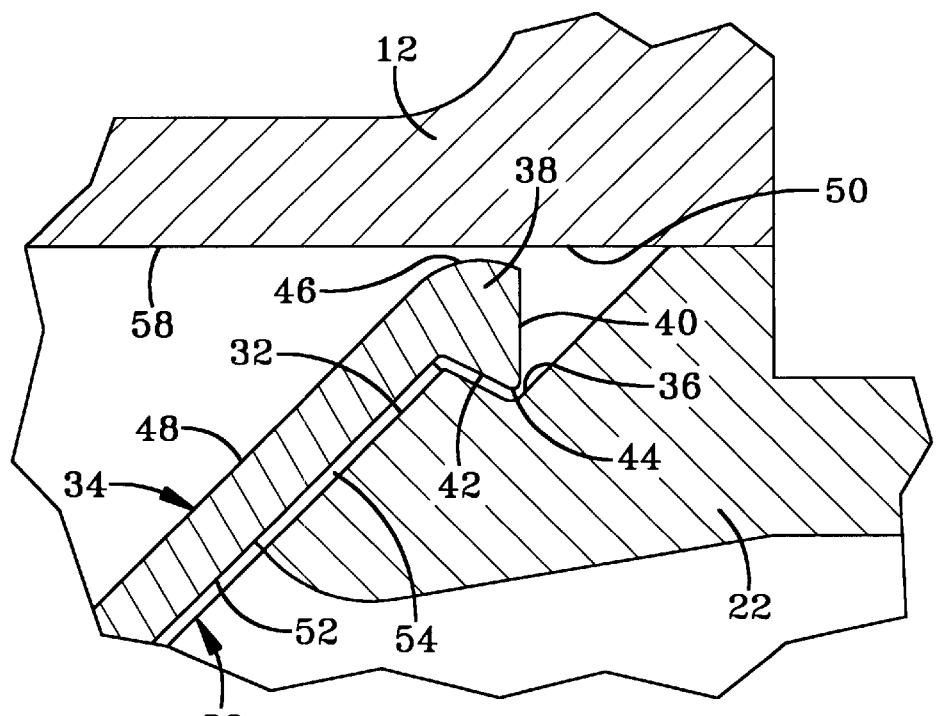
FIG. 5A is an enlargement of that portion of FIG. 2 delineated by the chain-line circle designated as "SEE FIG. 5A" and focusing on the hinge point for the valve disc; and, FIG. 5B is a view similar to FIG. 5A but with the valve disc having been pivoted more toward the valve open position.
Figure 5B:
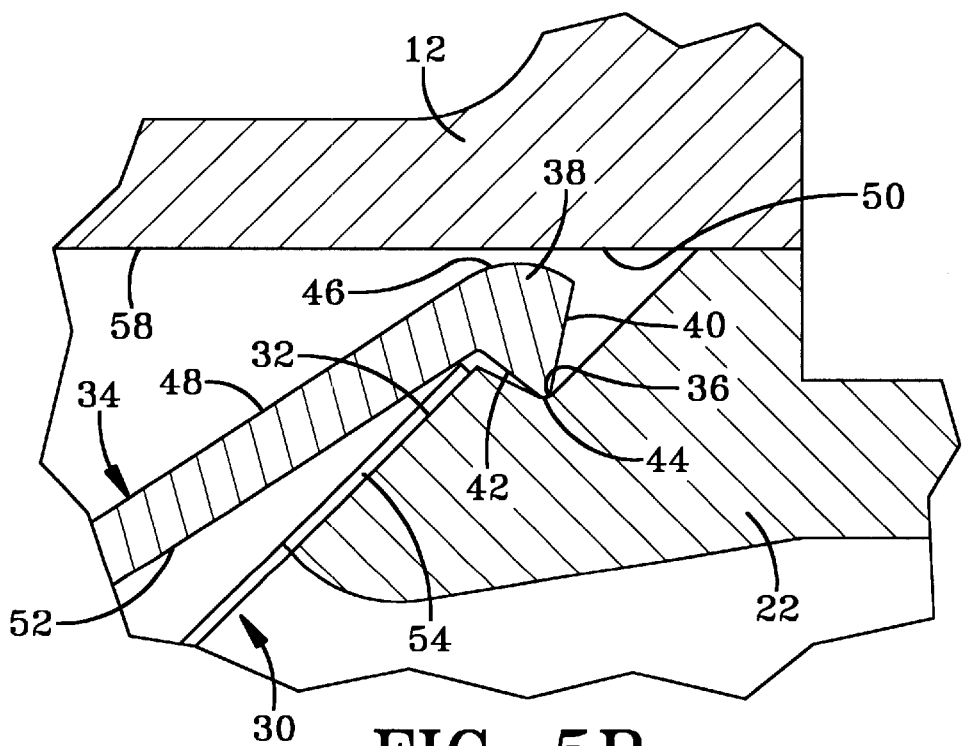

An untethered valve disc 34 is disposed adjacent the valve seat 22 to be pivotally moveable, in part, about a hinge point, or fulcrum, 36 recessed into the valve seat 22. An extension 38 formed on the valve disc 34 cooperatively engages the hinge point 36 during at least a portion of the valve disc's pivotal movement to permit opening and closing movement of the valve disc 34. As shown, the extension 38 may have converging, generally planar, side walls 40 and 42 that merge in an apex 44 which is received in the recessed hinge point 36, as best seen in FIGS. 5A and 5B. The apex 44, however, is not in continuous engagement with the hinge point 36. When the valve disc 34 fully engages the valve surface 32 the apex 44 will not be in contact with the hinge point 36, as represented in FIG. 5A.

Figure 4:
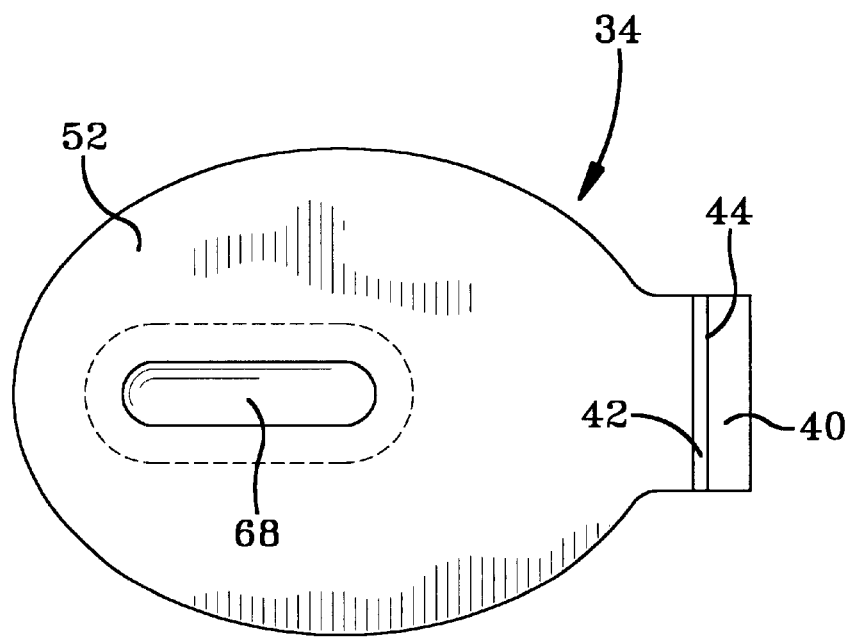
FIG. 4 is a plan view of the valve disc taken along line 4—4 in FIG. 3.

With continued reference to FIGS. 5A and 5B, The outer surface 46 of extension 38 is defined by the juncture of the reverse surface 48 on the valve disc 34 and one planar side wall 40 on the extension 38. The outer surface 46 is preferably curvilinear to permit a rolling, and sliding, engagement with a reaction surface 50 on the valve housing 12, as may or may not be required and for a purpose that will be hereinafter more fully described in conjunction with the explanation as to the opening of the valve assembly 10. The engaging surface 52 of valve disc 34 is preferably elliptical, as best seen in FIG. 4. Hence, the valve surface 32 on valve seat 22 and the engaging surface 52 on the valve disc 34 engage each other when the valve is closed so that each surface 32 and 52 may be a component of a sealing interface 54 when the valve assembly 10 is closed, as depicted in FIG. 1.

The sealing interface 54 circumscribes the elliptical opening 30 in the valve surface 32. The operative sealing action of interface 54 may result from the nature of the engaging surfaces themselves—ie.: the engaging surfaces 32 and 52 may be appropriately provided, or coated, with a surface that seals on engagement—or a gasket may be secured to one or the other, or both, of the engaging surfaces, or one or the other of the engaging surfaces may be recessed to receive a sealing member. The means by which the seal is effected should be that most appropriate, and compatible, to the liquid, or gas, the flow of which is to be controlled by the valve assembly 10.

When the valve 10 is closed (FIG. 1) the inlet port 16 opens into an inlet, or input, chamber 56 delineated by the valve disc 34, a downwardly directed surface 58 presented from an upper, transverse wall 60 in valve housing 12 (as an extension of the reaction surface 50) and an upwardly directed surface 62 on a medial wall 64 in valve housing 12. Furthermore, when the valve 10 is closed, the outlet, or output, port 20 opens into an outlet, or output, chamber 66 delineated by the valve disc 34 and any portion of the valve seat 22 not covered by the valve disc 34 and the aforesaid surfaces 58 and 62.

Figure 3:
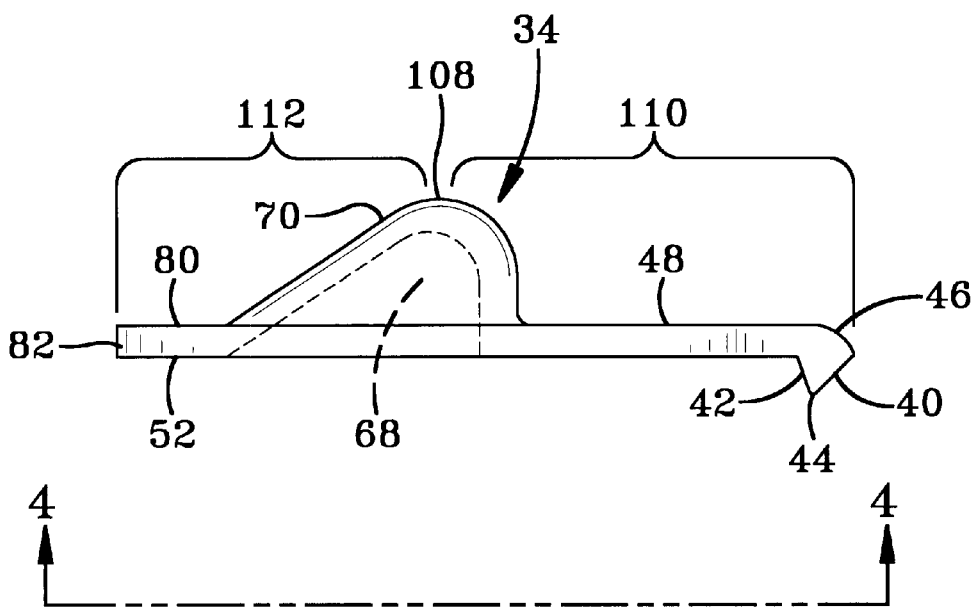
FIG. 3 is a side view of the valve disc employed in FIGS. 1 and 2.

With particular reference to FIGS. 3 and 4, an oblong recess 68 is presented by a protuberance 70 on the valve disc 34 that is adapted to receive that end of a control rod 72 which will, at least during opening of the valve, serve as a second fulcrum 73 (FIG. 1). The control rod 72 is part of a control mechanism 74 that includes the control rod 72 and a motor 76 (all components which impart motion of rod 72 to control valve disc 34). When the valve disc 34 is fully opened, as seen in FIG. 2, the protuberance 70 of the valve disc 34 is positioned in a recess 78 formed in the valve housing 12, and a surface 80 on the rim 82 of valve disc 34 abuts a stop surface 84 on the valve housing 12, as seen in FIG. 2.

The control rod 72 extends through aligned openings 86 and 88 formed in the valve seat 22 and the valve housing 12, respectively. That end of the control rod 72 opposite the second fulcrum 73 is seated in a recess 90 formed in a piston 92 that is a component of the motor 76. The motor 76 also includes a diaphragm 94 that is secured to the piston 92 and anchored between the motor cover 14 and the valve housing 12. The diaphragm 94 cooperates with the cover 14 to form a control chamber 96 that, when pressurized, will cause the piston 92 of the motor 76 to pivot the valve disc 34 (primarily about the engagement of the fulcrum 73 on rod 72 with the recess 68 and to some degree about the hinge point 36) thereby opening a flow path between the inlet chamber 56 and the outlet chamber 66.

Although a rolling diaphragm 94 is depicted in the drawings, it should be noted that a convoluted or dished diaphragm may be utilized to produce the desired results.

The chamber 96 has an inlet control port 98 and an outlet control port 100 that are disposed in fluid communication with control valve means 102 and 104, respectively. During operation of the valve 10, control fluid is supplied to the chamber 96 through the inlet control valve means 102 and exhausted from the chamber 96 through the outlet bleed orifice or control valve 104.

A portion of the pressurized fluid supplying the inlet chamber 56 may be diverted through the inlet control valve means 102. However, that is not a requirement. One may provide a wholly independent source for the pressurized fluid admitted to the chamber 96. The desirability of such a distinctly separate source becomes apparent when one considers that the fluid being controlled by valve 10 may include material in suspension that could readily clog, or disrupt, the operation of the inlet control valve means 102. Obviously, the pressure of the fluid admitted through the pilot valve 102 must be at least equal to the pressure of the fluid within the inlet chamber 56.

There are four types of control used with valves such as valve 10: viz.: on-off, modulating, pressure regulating and proportioning.

For on-off control, valve 102 is either a manual or automatic on-off valve and 104 is a bleed orifice. When valve 102 is open, pressure developed by motor 76 is sufficient fully to open valve disc 34. When valve 102 is shut, fluid driving motor 76 exits through bleed orifice 104 so that motor 76 exerts no force against valve disc 34. Under this condition Inlet fluid pressure forces valve disc 34 to the closed position.

For modulating control, valve 102 is a manual or automatic modulating valve used in conjunction with a bleed orifice 104. This arrangement allows valve disc 34 to be held in any position between fully open and fully closed.

For pressure regulation, valve 102 is a pilot regulator of the type used to control piloted pressure regulators. Because the operation of these regulators is well understood by those skilled in the art, a description of them is omitted.

For proportioning control, both valves 102 and 104 are on-off pulsing solenoids. To drive the valve 10 to a more open position, valve 04 is shut and valve 102 is opened in short pulses. When the flow rate through valve 10 is far removed from the set point, the pulses are closely spaced, thus admitting fluid to the motor 76 at a rapid rate and moving the valve disc 34 rapidly. However, as the flow rate approaches the set point, the electronic controller (not shown) gradually lengthens the interval between pulses, thus slowing the valve speed. It is well known in the art that the above system provides proportioning control and prevents overshoot.

It is imperative to recognize that the effective area of the diaphragm 94 must be greater than the effective area of the reverse surface 48 on elliptical valve disc 34 in order to permit the control fluid entering chamber 96 to be directed from the source of fluid feeding the inlet chamber 56.

It should also be recognized that a valve embodying the concepts of the present invention is adept at handling both liquid and gasses. Hence, when the term "fluid" is used, that term may be appropriately read as "gas" or as "liquid."

Opening the Valve

To this point the opening and closing of the valve 10 has been referenced but not explained. As such, and with particular reference to FIGS. 1 and 5, it should be understood that the pressure of the fluid within the inlet chamber 56, acting upon the reverse surface 48 of valve disc 34, serves to seat the valve disc 34 sealingly against the valve surface 32—in which position the valve 10 is closed, as depicted in FIGS. 1 and 5A.

To open the valve 10, pressurized fluid is fed into chamber 96, and that pressure, acting on the area of the diaphragm 94 exposed to chamber 96, translates the control rod 72 along its axis and against the recess 68 delineated by the concave side of protuberance 70.

It will be observed that the projected area on the entire reverse surface 48 of the valve disc 34 can be considered as two distinct portions. As shown in FIG. 3, that portion which extends from approximately the apex 108 of the protuberance 70 to the relatively outer surface 46 of extension 38 is designated as portion 110. That portion which extends in the opposite direction from approximately the apex 108 of protuberance 70 to the outer extent of the rim 82 is designated as portion 112. The apex 108 is loosely designated as being that location on reverse surface 48 intercepted by the projected axis 114 of control rod 72, as best seen in FIG. 1.

The projected area of portion 110 is greater than the projected area of portion 112. Hence, when the pressure of the fluid within inlet chamber 56 is applied to both portions 110 and 112, a greater force is applied to portion 110 than to portion 112. Thus, when the control rod 72 is extended by the action of motor 76, the projecting end of the control rod 72 will serve as a fulcrum 73 as it engages the recess 78 in valve disc 34, and the valve disc 34 will tend to pivot, or rotate, clockwise as viewed in FIGS. 1, 5A and 5B. Thus, even though the apex 44 of extension 38 may not be in physical contact with the hinge point 36 when the valve 10 is closed (FIG. 5A), as soon as extension of the control rod 72 applies pressure to the oblong recess 68, the valve disc 34 will begin to rotate clockwise to initiate opening of the valve 10. This pivotal rotation of the valve disc 34 will assure that the apex 44 of extension 38 engages the hinge point 36 (FIG. 5B), and that engagement will be maintained throughout the remainder of the opening procedure by virtue of the force applied to portion 110 of the valve disc 34 by the fluid pressure within the inlet chamber 56.

It is appreciated that, as depicted, the control rod 72 may be inclined during some portion of its passage through the openings 86 and 88 to engage the recess 78, and whereas that modest initial inclination (FIG. 1) may well impart a correspondingly moderate lateral force in addition to the more significant axial force (relative to the axis 114 of the control rod 72) to the recess 78 (and thus the valve disc 34), the resulting sliding engagement of the curvilinear outer surface 46 of the extension 38 with the reaction surface 50 would preclude lateral displacement of the valve disc 34 and serve to enhance the clockwise rotation of the valve disc 34 occasioned by the fluid pressure within the inlet chamber 56 to open the valve 10, irrespective of any lateral force component applied by fulcrum 73, the continued translation of control rod 72 in response to motor 76 will assure that the disposition of the valve disc 34 will be pivoted from its position depicted in FIG. 1 to the disposition thereof depicted in FIG. 2—thereby effecting opening of the valve 10, and, as represented in FIG. 2, the modest inclination of the control rod 72 may well be exacerbated by the time the valve 10 is fully opened.

Finally, it should be appreciated that the new and novel elliptical valve disc 34 and its unique relation with the fulcrum, or hinge point, 36 makes the aforesaid structural combination highly desirable for many valve purposes. In some environments, for example, when that combination is subjected to higher fluid pressure on the engaging surface 52 than on the reverse surface 48, opening the valve disc 34 could be effected merely by that pressure differential. Yet, the opposite pressure differential could effect closing of the valve disc 34. In the proper environment such an arrangement could provide a check valve operation.

Although the mechanical interaction of the axially translatable control rod 72 with the valve disc 34 provides completely reliable operation, it should be understood that one could also substitute, for example, a rotary lobe (not shown) for the axially translatable control rod 72.

CONCLUSION

While only one preferred embodiment of the present invention is disclosed, it is to be understood that the concepts of the present invention are susceptible to numerous changes apparent to one skilled in the art. Therefore, the scope of the present invention is not to be limited to the details shown and described but is intended to include all variations and modifications which come within the scope of the appended claims.

What is claimed is:

1. A valve assembly to control fluid flow, said valve assembly comprising:

a valve body having an inlet port;

a valve seat disposed in said valve body and presenting an outlet port substantially axially aligned with said inlet port to define an axial flow path through said valve body;

an untethered valve disc capable of pivotal movement with respect to said valve seat in said axial flow path;

said valve disc located intermediate said inlet port and said outlet port to delineate an inlet chamber on one side of said valve disc and an outlet chamber on the other side of said valve disc;

said valve disc presents an apex;

said valve seat has a recess to receive said apex as a fulcrum;

a control mechanism provides a mechanical member to engage said valve disc to initiate opening movement of said valve disc; and, fluid pressure in said inlet chamber acting on said valve disc at least during opening movement of said valve disc.

2. The valve assembly defined in claim 1 wherein:

said extension has a curvilinear surface to engage said valve body and thereby maintain said apex within the recess defining a fulcrum.

3. The valve assembly defined in claim 1 further comprising:

a control mechanism including a motor and a control rod disposed angularly relative to said axial flow path to control fluid flow between said inlet and outlet chambers;

said control rod having opposite ends said motor imparting generally axial forces directly to one end of said control rod;

the other end of said control rod eccentrically engaging said valve disc as a fulcrum such that axial translation of said rod allows the valve disc to pivot in response to the pressure applied against the valve disc by the pressurized fluid in said inlet chamber; and, said control rod engaging said valve disc to transfer fore generated by said motor pivotally to move said valve disk and thereby control the fluid flow between said inlet port and said outlet port via said axial flow path.

4. The valve assembly defined in claim 3 wherein:

said eccentricity defining a larger projected area of said valve disc toward said inlet chamber on one side of the engagement of said control rod with said valve disc than on the other side of the engagement of said control rod with said valve disc; and, axial projection of said control rod by said motor initiates, and continues, pivotal movement of said valve disc by the fluid pressure within said inlet chamber acting upon said projected areas of said valve disc.

5. The valve assembly defined in claim 3 further comprising:

said valve seat presenting an elliptical opening facing said inlet port; and, said valve disc having an elliptical portion cooperating with said valve seat to close said elliptical opening when said valve is closed.

6. The valve assembly defined in claim 5 further comprising:

a sealing interface circumscribing said elliptical opening and operative between said valve seat and said valve disc to close said elliptical opening when said valve is closed.

7. The valve assembly defined in claim 4 wherein:

said valve disc has a protuberance with an oblong recess formed therein for receiving one end of said control rod; and, said housing having a compatible recess formed therein to receive said protuberance when said valve disc is fully opened.

8. The valve assembly defined in claim 4 further comprising:

a cover secured to said valve body;

said motor comprising a diaphragm secured between said cover and said valve body and a piston secured to said diaphragm;

a chamber formed by said diaphragm and said cover adapted to receive control fluid to operate on said piston to urge said control rod to pivot said valve disc and thereby open said valve.

9. The valve assembly defined in claim 8 further comprising:

means for controlling fluid flow into said chamber to control the opening of said valve disc, and means for controlling fluid flow from said chamber to control the closing of said valve disc.

10. The valve assembly defined in claim 9 further comprising:

a cavity formed by said valve body and said diaphragm and being open to said outlet port through aligned openings formed in said valve body and said valve seat;

said control rod extending through said aligned openings from said piston to an oblong recess formed in said valve disc.

11. The valve assembly defined in claim 9 wherein:

said inlet control valve means is a simple throttling valve; and, said outlet control valve means is an orifice.

12. The valve assembly defined in claim 9 wherein:

said inlet control valve means is a simple throttling valve; and, said outlet control valve means is also a simple throttling valve.

13. The valve assembly defined in claim 9 further comprising:

said means for controlling fluid flow into said chamber including a first electronically controlled valve; and, said means for controlling fluid flow from said chamber including a second electronically controlled valve.

14. A valve assembly comprising:

a valve body having an inlet port;

a valve seat disposed in said valve body and presenting an outlet port;

a generally elliptical opening penetrating said valve seat and being circumscribed by a valve surface;

an untethered valve disc capable of pivotal movement with respect to said valve seat;

said valve disc presenting a generally elliptical engaging surface adapted to engage said valve surface and close said elliptical opening when said valve is closed;

an inlet chamber housed within said valve body and communicating with said inlet port;

said valve disc also having a reverse surface;

said reverse surface on said valve disc continuously facing said inlet chamber;

an outlet chamber communicating with said outlet port;

said engaging surface on said valve disc facing said outlet chamber when said valve is closed; and, means to pivot said valve disc in order to open said valve.

15. The valve assembly defined in claim 14 further comprising:

a control rod having opposite ends housed within said valve body; and, means axially to translate said control rod selectively to pivot said valve disc.

16. The valve assembly defined in claim 15 further comprising:

a protuberance extending outwardly from said reverse surface on said valve disc;

an oblong recess in said engaging surface defined by said protuberance one end of an axially translatable control rod received in said recess;

a motor operatively attached to the other end of said control rod to effect selective translation of said rod.

17. The valve assembly defined in claim 16 wherein:

said control rod has opposite ends;

said motor imparts generally axial forces directly to one said end;

the other said end of said control rod eccentrically engages said valve disc as a fulcrum;

said eccentricity defining a larger projected area of said valve disc toward said inlet chamber on one side of the engagement of said control rod with said valve disc than on the other side of the engagement of said control rod with said valve disc; and, axial projection of said control rod by said motor initiates, and continues, pivotal movement of said valve disc by the fluid pressure within said inlet chamber acting upon said projected areas of said valve disc.

* * * * *